United States Patent [19]
Dixson et al.

[11] 3,862,032
[45] Jan. 21, 1975

[54] ION EXCHANGE WASTE WATER TREATMENT PROCESS

[75] Inventors: Donn Lewis Dixson, East Granby, Conn.; Bernard Anthony Roche, Springfield, Mass.

[73] Assignee: Combustion Engineering, Inc., Windsor, Conn.

[22] Filed: Apr. 17, 1973

[21] Appl. No.: 351,930

[52] U.S. Cl. .................... 210/33, 210/34, 210/159, 210/189
[51] Int. Cl. ........................................... B01d 15/06
[58] Field of Search ................ 210/33, 34, 159, 189

[56] References Cited
UNITED STATES PATENTS
3,745,114   7/1973   Dixson ............................ 210/189 X
3,775,310   11/1973   Conway et al. .................. 210/189 X

*Primary Examiner*—Frank A. Spear, Jr.
*Assistant Examiner*—Ferris H. Lander

[57] ABSTRACT

The waste water from the regeneration system of a demineralizer system is treated by ion exchange and filtration so that the water can be immediately reused in subsequent steps of the regeneration process. This reduces the amount of waste requiring further treatment before being released to the environment. The resin used to treat the water can either be exhausted resin from a demineralizer unit or regenerated resin. Some of the acid from the regeneration process may also be recovered for reuse.

21 Claims, 1 Drawing Figure

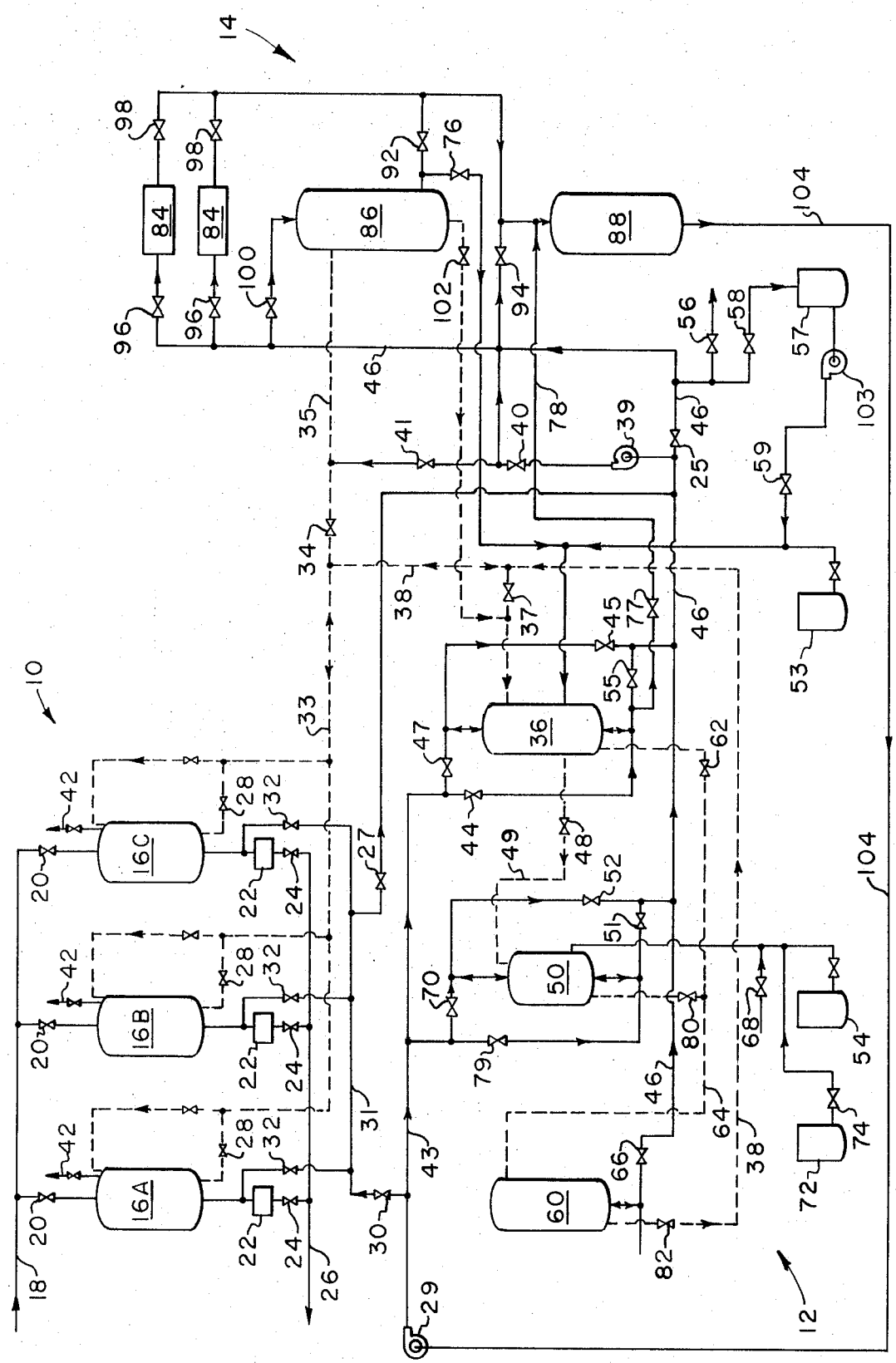

ION EXCHANGE WASTE WATER TREATMENT PROCESS

BACKGROUND OF THE INVENTION

Currently demineralizer systems are employed in a number of different applications. One such application is for treatment of the condensate flow for steam generator turbine power cycles. Other such uses are to treat make-up water to render it suitable for use in conventional power cycles and to treat spray injection water for gas turbine or combined cycle operation for the purpose of $NO_x$ control.

During operation, the resin bed in the condensate demineralizer unit removes dissolved as well as suspended solids from the steam generator feedwater flow. After the resin has completed its service cycle, it is transferred to external vessels to be regenerated. During the regeneration process large quantities of waste are generated. For fossil fuel power stations this represents the major portion of the liquid waste coming from the site. For example, regeneration of the condensate demineralizer system employed on a 800 Megawatt steam generator will produce approximately 42,000 gallons of waste water per regeneration or 6,300,000 gallons per year. The disposal of this liquid waste can represent significant problems in that it contains such material as filtered cycle corrosion products, principally oxides of iron, and exchange cycle pH treatment chemicals as well as condenser leakage salts removed during the service cycle, in addition to the chemicals used for resin regeneration, principally sodium hydroxide and sulfuric acid. The problem of regeneration waste disposal is even more critical with nuclear reactor systems having condensate demineralizers, in that this waste can be radioactive. This represents a significant increase in loading to the radioactive waste management system; perhaps a 20 to 30 gpm increase for a 1000 megawatt unit.

SUMMARY OF THE INVENTION

An object of the present invention is to provide for the treatment and recycle of the regeneration waste water from a demineralizer system so that it can be reused in subsequent steps of the resin regeneration process. This object is accomplished by subjecting the waste water to ion exchange treatment. One embodiment of the invention uses exhausted resin from a demineralizer unit to treat the waste water while another embodiment uses regenerated resin. In either case the ion exchange resins are generated in the same system as the resin from the demineralizers. A further feature of the invention is that some of the waste water may be treated only by filtration. Another object of this invention is to recover and reuse acid from the regeneration system.

BRIEF DESCRIPTION OF THE DRAWING

The drawing is a flow diagram illustrating the present invention as applied to a mixed bed condensate demineralizer system.

DESCRIPTION OF THE PREFERRED EMBODIMENTS

The invention will be described as it is applied to a mixed bed demineralizing system such as might be used for condensate demineralizing in steam power plants. However, it is to be understood that the invention can also be applied to other ion exchange systems.

In the drawing the demineralizing system is designated generally at 10, the regeneration system generally at 12 and the regeneration waste treatment system generally at 14. The demineralizing system includes three mixed bed demineralizers 16A, 16B and 16C. It will be understood, of course, that as many demineralizers as desired may be used. The incoming water to be treated enters through line 18 and is fed to the respective demineralizers through valves 20. The demineralized water is then discharged from the demineralizers through the respective resin traps 22 and valves 24 and out through line 26.

The demineralizers are operated on a programmed schedule such that at least some of the units will be in operation when others are exhausted and ready for resin replacement. For example, the demineralizing units 16A and 16B might be in service while the unit 16C is out of service for resin replacement. The replacement of the exhausted resin is accomplished by transferring it to system 12. This is done by stopping water supply to unit 16C by closing the valves 20 and 24 and opening the valve 28 for unit 16C. The resin is then hydraulically transferred from this unit with water being supplied by pump 29 through valve 30, line 31 and valve 32 for unit 16C. This allows the resin to flow out of vessel 16C through valve 28 and line 33 and then initially through valve 34 and line 35 into regeneration waste treatment system 14. After a predetermined volume of resin has been admitted to this system 14, valve 34 closes and valve 37 opens to allow the rest of the resin charged to be transferred through line 38 to cation regeneration vessel 36. At the same time water is introduced by pump 39 through valves 40 and 41 to flush the remaining resin from line 35. The demineralizer unit 16C is then drained through valves 32 and 27 and forced by means of pump 39 through valves 40 into the regeneration waste treatment system 14. This water which is drained from the demineralizers during the resin transfer process is the prime source of make-up water for the regeneration system to replace the water which is not reclaimed. The demineralizer 16C is then refilled with regenerated resin from the storage vessel 60 as will be explained hereinafter. Each demineralizer has a valved vent line 42 which is used during resin transfer operations.

The regeneration process is the conventional process used for the regeneration of mixed resins. In order to separate the cation and anion resins in vessel 36, water is introduced upwardly through the vessel 36 by means of the pump 29 through line 43 and valve 44. The water flowing upwardly through the resin causes the anion and cation resins to stratify with the anion resin overlying the cation resin. The water flows out the top of vessel 36 and then through valve 45, line 46, and valve 25 to the regeneration waste treatment system 14. After the resins have been separated and they are allowed to settle, the anion resin is transferred from vessel 36 by water which flows through valve 44 and up through vessel 36 as well as through valve 47 down through vessel 36. The anion resin flows out through valve 48 and line 49 and is introduced into the anion regeneration vessel 50. The water from this transfer operation then flows out the bottom of vessel 50 through valve 51, line 46 and valve 25 to the regenerant waste treatment system 14.

The anion and cation resins are then air scrubbed (by an air system, not shown) for the purpose of loosening accumulated particulate material. Each resin is then backwashed for the purpose of removing the loosened particulate material and resin fines from the resin bed. This backwash is accomplished by flowing water upwardly through each of the vessels 36 and 50 with the water then going through valves 45 and 52, respectively, and then through line 46 and valve 25 to the waste treatment system 14. The regeneration of the cation and anion resins is then carried out in the conventional manner by the introduction of acid from tank 53 to the cation regeneration tank 36 and by the introduction of caustic from tank 54 to anion regeneration tank 50. Acid may also be used from the acid recovery system which will be described later. The waste from the acid and caustic regeneration steps is then sent through valves 55 and 51, respectively, and then valve 56 to a neutralizing tank (not shown) before disposal.

After regeneration with acid, the cation regeneration tank 36 is flushed with water from valve 47. This operation flushes residual acid out of the tank 36 and into the acid recovery tank 57 through valve 58. This recovered acid is then reused in subsequent cation regeneration process. This is done by first using recovered acid for cation regeneration followed by fresh acid to complete the regeneration process. The recovered acid is fed from the acid recovery tank 57 into the regeneration system via pump 103 and valve 59.

Following the regeneration of the cation resin, the resin is rinsed by flowing water through valve 47 and then downwardly through the cation regeneration vessel 36 and then out through valve 55, line 46 and valve 25 to the waste treatment system 14. The cation resin is then transferred from vessel 36 to the resin mix and storage vessel 60 through valve 62 and line 64. The water that is used to transfer the cation resin is discharged from the vessel 60 through valve 66, line 46, pump 39 and valves 40 to the waste treatment system 14.

Following regeneration of the anion resin with caustic, rinse water from valve 68 (which is also used for caustic dilution) is introduced slowly into the anion regeneration tank 50 to flush residual caustic and it is discharged through the valves 51 and 56 to the neutralizing tank. This first rinse of the anion resin is followed by a fast rinse of water flowing through line 43 and valve 70 and downwardly through the tank 50 and then through valve 51, line 46 and valve 25 to the waste treatment system 14.

Provision is also made for placing the regeneration resin charge in the ammonia form. This is accomplished by feeding ammonia from the supply 72 through valve 74 into the anion regeneration vessel 50 after the anion resins have been regenerated and rinsed. The purpose of the ammoniation is to convert any cation resin which has been carried over into the anion regeneration vessel 50 into the ammonia form. Without the ammoniation, this carried-over cation resin would be in the sodium form as a result of the contact with caustic during the anion regeneration. The ammonia is discharged from the anion regeneration vessel 50 through the valve 51 and is then conducted through line 46 and valve 25 to the regeneration waste treatment system 14. The function of the ammonia in the regeneration waste treatment system 14 will be described hereinafter. The ammonia is then returned to the regeneration system 12 through the valve 76 and into the cation regeneration vessel 36 to place the cation resin in the ammonia form. The waste from this process exits vessel 36 via valve 77 and returns to the regeneration waste treatment system 14 through line 78.

After ammoniation, the anion resin is again rinsed with the rinse water being sent to the regeneration waste treatment system 14 through line 46 and valve 25. The anion resin is then transferred to the resin mix and storage vessel 60. This transfer is accomplished by introducing water through valve 79 into the vessel 50 which flushes the resin out through valve 80 and lines 64 to the vessel 60. The water used in the transfer flows out of vessel 60 through valve 66 and line 46 and then through pump 39 and valve 40 to the regeneration waste treatment system 14.

The resin mix and storage vessel 60 is then partially drained of water which is also sent to the regeneration waste treatment system 14 through pump 39 and valve 40, and air is blown up through the anion and cation resins in the vessel 60 to mix the two resins (air system not shown). The resins in the vessel 60 are then rinsed again with water, which also goes to the regenerant waste treatment system 14, after which the resin is available to be transferred back through valve 82 and line 38 to the demineralizers when the next unit is ready for regeneration.

As can be seen from the description of the operation of the regeneration system, there are a large number of waste streams which are sent to the regenerant waste treatment system 14. These waste streams are divided into four categories: those which are low in both dissolved and suspended solids which are ready for reuse without treatment; those high in dissolved solids which are discharged from the system; those which are low in dissolved but high in suspended solids which are treated by filtration; and those moderate in dissolved solids which are treated by ion exchange and filtration. The preferred regeneration waste treatment system consists of filters 84, a rinse ion exhcanger 86 and a rinse hold tank 88 as well as the acid recovery tank 57. As previously discussed, a portion of the exhausted resin from the demineralizing units 16 is conducted from line 33 through valve 34 into the rinse ion exchanger 86. Although this resin is exhausted from a condensate demineralizing standpoint, it has reserve capacity for treating solutions relatively high in dissolved solids content at moderate flow rates. The water from the transfer of resin to the rinse ion exchanger 86 goes to the rinse tank 88 through valve 92.

The water used to transfer the cation and anion resins to the resin mix and storage vessel 60 and the water used to rinse the resins in vessel 60 are substantially clean waste streams containing little or not dissolved solids or suspended particles. These streams are introduced directly from line 46 either through valve 25 or through pump 39 and valve 40 to the valve 94 and into the rinse tank 88. It should be pointed out that the pump 39 is used to transfer streams to the regeneration waste treatment system 14 where there is insufficient head on the streams such as when vessels are merely being drained. The other streams have sufficient head so that the pump 39 is not necessary for the transfer.

A number of the waste streams from the regeneration system 12 contain suspended particles but little or no dissolved solids. These streams include the following in their order of occurrence in the regeneration process: water used to transfer exhausted resin to regeneration system 12; water drained from vessel 16C; water used to separate resins in vessel 36; water used to transfer anion resin to vessel 50; and anion and cation backwash water. These streams are conducted via line 46 and valves 96 to the filters 84, some via pump 39 and some via valve 25. One of the filters 84 would be used at a time while the other filter is being cleaned or is on standby. The cleaned water from the filters 84 goes through the valves 98 to the rinse tank 88.

The remaining waste streams from the regeneration system 12 contain dissolved solids. These include the following in their order of occurrence: cation rinse water; anion fast rinse water; ammonia from the anion regeneration vessel 50 and the second anion fast rinse water. These streams are conducted from the regeneration system 12 via line 46 and then through valve 100 into the rinse ion exchanger 86. As indicated previously, the resin in the exchanger 86 has sufficient residual ion exchange capacity to remove dissolved solids from these waste streams. This includes removing any tramp sodium which has been picked up by the ammonia solution in the anion regeneration vessel so that the sodium will not contaminate the cation resin. Also, the resin in the exchanger 86 acts as a filter to remove any suspended particles that might be present. The cleaned water from the exchanger 86 is then passed through valve 92 to the rinse tank 88. All of the other water from the regeneration system is relatively "clean" water and goes directly to tank 88. When the regeneration cycle has been completed, the resin from the exchanger 86 is transferred through valve 102 to the resin separation and cation regeneration vessel 36 to complete the cycle. This charge is subsequently regenerated with the next resin charge. The water which has been cleaned is temporarily stored in the rinse tank 88 where it can immediately be reused in the above regeneration process by conducting it through line 104 to the pump 29.

It can thus be seen that a large quantity of the water which is used in the regeneration process is recycled. The only waste streams which are not recycled are the acid and caustic regeneration solutions as well as the anion resin slow rinse which are sent to a neutralizing tank for subsequent disposal.

An alternate method of practicing the present invention is to use regenerated (or fresh) resin in the rinse ion exchanger 86 rather than exhausted resin from one of the demineralizers. This is accomplished by using regenerated resin from the resin mix and storage vessel 60 in the rinse ion exchanger. At the end of each regeneration cycle, the resin in the rinse ion exchanger 86 is then transferred to the resin separation and cation regeneration vessel 36 just as in the previously described method. Regenerated resin is then transferred from the resin mix and storage vessel 60 through valve 82, line 38, valve 34 and line 35 to the rinse ion exchanger 86 after a predetermined amount has been transferred, the remaining resin is directed to the demineralizer vessel. Line 35 is then flushed as previously described to clear the line of resin. The rinse ion exchanger is then ready for the next regeneration cycle and the resin from the rinse ion exchanger 86 which is now in vessel 36 is ready to be regenerated along with the resin from the next demineralizer to be regenerated.

While preferred embodiments of the invention have been shown and described, it is to be understood that there are merely illustrative and that changes may be made in the arrangement of the equipment and in the procedures to be followed and that the invention is only limited by the following claims.

What is claimed is:

1. In an ion exchanger treatment process wherein water is subjected to treatment by mixed anion and cation exchange resins in an ion exchange system, wherein said anion and cation exchange resins are subjected to a regeneration process in a regeneration system and wherein said regeneration process includes the steps of:
  a. transporting exhausted anion and cation exchange resins with water from said ion exchange system to said regeneration system,
  b. separating said anion and said cation exchange resins with water,
  c. transferring said separated anion exchange resins with water to a position away from said cation exchange resins,
  d. backwashing both said anion and said cation exchange resins,
  e. regenerating said cation exchange resins with acid,
  f. flushing residual acid from said cation exchange resins with water,
  g. rinsing said cation exchange resins with water,
  h. transferring said cation exchange resins to a mixing station with water,
  i. regenerating said anion exchange resins with caustic,
  j. flushing residual caustic from said anion exchange resins with water,
  k. rinsing said anion exchange resins with water,
  l. transferring said anion exchange resins to said mixing station with water, and
  m. mixing said anion and said exchange cations resins at said mixing stations;

the process of treating and recovering waste water from said regeneration process in a waste processing system including the steps of:
  aa. storing water from steps (h) and (l) for reuse in said regeneration process,
  bb. filtering water from steps (a), (b), (c) and (d) and storing said filtered water for reuse in said regeneration process,
  cc. providing ion exchange resins in said waste processing system, and
  dd. contacting water from steps (g) and (k) with said provided ion exchange resins to remove dissolved solids and storing said contacted water for reuse in said regeneration process.

2. A process as recited in claim 1 and further including the step of transferring ion exchange resins from said waste processing system to said regeneration system for regeneration together with said exhausted anion and cation exchange resins from said ion exchange system.

3. A process as recited in claim 1 wherein said step (cc) of providing ion exchange resins comprises the step of providing mixed anion and cation exchange resins.

4. A process as recited in claim 3 wherein the step of providing mixed anion and cation exchange resins includes the step of transporting exhausted anion and cation exchange resins with water from said ion exchange system to said waste processing system.

5. A method as recited in claim 3 wherein the step of providing mixed anion and cation exchange resins includes the step of transporting regenerated resins with water from said mixing station in said regeneration system to said waste processing system.

6. A process as recited in claim 1 and further including the step of recovering acid from said regeneration process comprising the step of collecting said flushed residual acid from step (f) for reuse in step (e).

7. A process as recited in claim 6 wherein said step (e) of regenerating said cation exchange resins includes treating said cation exchange resins with said collected residual acid.

8. A process as recited in claim 1 wherein said water used for steps (a), (b), (c), (d), (e), (g), (h), (i), (k) and (l) is at least partially said stored water from steps (aa), (bb) and (dd).

9. In an ion exchange treatment process wherein water is subjected to treatment by ion exchange resins in an ion exchange system, wherein said ion exchange resins are subjected to a regeneration process in a regeneration system and wherein said regeneration process includes the steps of:
   a. transporting exhausted ion exchange resins with water from said ion exchange system to said regeneration system,
   b. draining water from said ion exchange system,
   c. backwashing said ion exchange resins,
   d. regenerating said ion exchange resins with a regenerating solution,
   e. flushing said regenerating solution from said ion exchange resins,
   f. rinsing said ion exchange resins with water; and
   g. transferring said ion exchange resins to a storage station with water;
the process of treating and recovering waste water from said regeneration process in a waste processing system including the steps of:
   aa. storing water from step (g) for reuse in said regeneration process,
   bb. filtering water from steps (a), (b) and (c) and storing said filter water for reuse in said regeneration process,
   cc. providing ion exchange resin in said waste processing system, and
   dd. contacting water from step (f) with said provided ion exchange resin to remove dissolved solids and storing said treated water for reuse in said regeneration process.

10. A process as recited in claim 9 and further including the step of transferring ion exchange resins from said waste processing system to said regeneration system for regeneration together with said exhausted ion exchange resins from said ion exchange system.

11. A process as recited in claim 9 wherein the step (cc) of providing ion exchange resins includes the step of transporting exhausted ion exchange resins with water from said ion exchange system to said waste processing system.

12. A method as recited in claim 9 wherein the step (cc) of providing ion exchange resins includes the steps of transporting regeneration ion exchange resins with water from said storage station in said regeneration system to said waste processing system.

13. A process as recited in claim 9 and further including the step of recovering regenerating solution from said regeneration process comprising the steps of collecting said flushed regenerating solution from step (e) for reuse in step (d).

14. A process as recited in claim 13 wherein said step (d) of regenerating said ion exchange resins includes treating said ion exchange resins includes treating said ion exchange resins with said collected regenerating solution.

15. A process as recited in claim 9 wherein the said water used for steps (c), (f) and (g) is at least partially said stored water from steps (aa), (bb) and (dd).

16. In an ion exchange treatment process wherein water is subjected to treatment by ion exchange resins in an ion exchange system and wherein said ion exchange resins are subjected to a regeneration process which produces waste water containing dissolved solids and suspended solids, the steps of treating said waste water in a waste processing system so as to remove said dissolved and suspended solids from said waste water and reusing said treated waste water in said regeneration process.

17. A process as recited in claim 16 wherein said step of treating includes the steps of removing suspended solids by filtration and removing dissolved solids by ion exchange.

18. A process as recited in claim 17 wherein said step of removing dissolved solids by ion exchange comprises the steps of:
   a. transferring exhausted ion exchange resins with water from said ion exchange system to said waste processing system and
   b. contacting said waste water containing dissolved solids with said transferred exhausted ion exchange resins.

19. In an ion exchange treatment process wherein water is subjected to treatment by ion exchange resins, wherein said ion exchange resins are subjected to a regeneration process and wherein said regeneration process includes the steps of:
   a. regenerating said ion exchange resins with regenerating solution,
   b. flushing residual regenerating solution from said ion exchange resins with water, and
   c. rinsing said ion exchange resins with water;
the process of treating and recovering waste water from said regeneration process in a waste processing system including the steps of:
   aa. providing ion exchange resins in said waste processing system,
   bb. contacting water from step (c) with said provided ion exchange resins to remove dissolved solids therefrom, and
   cc. storing said contacted water for reuse in said regeneration process.

20. In an ion exchange treatment process wherein water is subjected to treatment by mixed anion and cation exchange resins, wherein said anion and cation exchange resins are subjected to a regeneration process and wherein said regeneration process includes the steps of:
   a. separating said anion and said cation resins with water,
   b. regenerating said cation resins with acid,
   c. flushing residual acid from said cation resins,
   d. rinsing said cation resin with water,
   e. regenerating said anion resins with caustic,
   f. flushing residual caustic from said anion resins with water, and g. rinsing said anion resins with water;

the process of treating and recovering waste water from said regeneration process in a waste process system including the steps of:

aa. filtering water from step (a) and storing said filtered water for reuse in said regeneration process, bb. providing ion exchange resins in said waste processing system, and cc. contacting water from steps (d) and (g) with said provided ion exchange resins to remove dissolved solids, and dd. storing said contacted water for reuse in said regeneration process.

21. A process as recited in claim 20 wherein said provided ion exchange resins comprise anion and cation exchange resins.

* * * * *

UNITED STATES PATENT OFFICE
CERTIFICATE OF CORRECTION

PATENT NO. : 3,862,032
DATED : January 21, 1975
INVENTOR(S) : Donn Lewis Dixson and Bernard Anthony Roche It is certified that error appears in the above-identified patent and that said Letters Patent are hereby corrected as shown below:

| | |
|---|---|
| Column 1, line 51 | delete "generated" and insert --regenerated--. |
| Column 3, line 51 | delete "regeneration" and insert --regenerated--. |
| Column 4, line 62 | delete "where" and insert --when--. |
| Column 6, line 8 | delete "exchanger" and insert --exchange--. |
| Column 6, line 38 | delete "stations" and insert --station--. |
| Column 7, line 62 | delete "steps" and insert --step--. |
| Column 7, line 63 | delete "regeneration" and insert --regenerated--. |

Signed and Sealed this ninth Day of December 1975

[SEAL]

Attest:

RUTH C. MASON
Attesting Officer

C. MARSHALL DANN
Commissioner of Patents and Trademarks